3,342,908
HALOGENATED MONO-PHOSPHORUS ALPHA-HYDROXY HYDROCARBYLPHOSPHONATE ESTERS AND THEIR PREPARATION
Gail H. Birum, Kirkwood, Mo., assignor to Monsanto Company, St. Louis, Mo., a corporation of Delaware
No Drawing. Filed Aug. 24, 1964, Ser. No. 391,793
14 Claims. (Cl. 260—953)

This invention relates to organophosphorus compounds, and to a process for preparing them. More particularly, this invention provides an improved process for preparing new halogenated mono-phosphorus alpha-hydroxyhydrocarbylphosphonate and phosphinate esters having at least two carbon atoms in the alpha-hydroxyalkyl group bonded to the phosphorus atom, and also provides uses for those compounds as efficient flame-retarding monofunctional reactants in polyurethane foam making recipes, and as gasoline soluble additives for use in fuel compositions to suppress pre-ignition of the fuel in internal combustion engines and to prevent carburetor and fuel line icing of the fuel mixture.

It is known that alkyl esters of alpha-hydroxy-alkylphosphonic acid can be prepared from alkyl esters of trivalent phosphorus acids by a two step process. For example, treating a trialkyl phosphite with a mineral acid produces a dialkyl hydrogenphosphonate (often termed a dialkyl phosphite) and addition of this to an aldehyde or ketone by base catalysis, according to the method of V. S. Abramov, Doklady Akad. Nauk U.S.S.R., vol. 73, p. 487 (1950), gives a dialkyl alpha-hydroxyalkylphosphonate. There are several disadvantages of this two step process. All acids in the hydrogenphosphonate must be removed or neutralized before the reaction with the aldehyde or ketone carbonyl compound. Some of the basic catalyst is destroyed by a side reaction with the phosphorus reactant and product. For a large scale reaction there is the danger of promoting an uncontrollable reaction when the catalyst is added to the mixture of hydrogenphosphonate and carbonyl reactants. And the basic catalyst must be destroyed before the alpha-hydroxyalkylphosphonate product is separated from the reaction mixture by distillation.

According to this invention we have found a method for avoiding the above problems and for obtaining very good yields of new halogen containing esters of alpha-hydroxyhydrocarbylphosphorus acids by a one step process that requires no catalyst. Briefly, this process comprises combining an aldehyde or ketone, a proton donor, and a neutral halogenated alkyl ester of a trivalent phosphorus acid to obtain the alpha-hydroxyhydrocarbyl pentavalent phosphorus product.

More specifically, this invention provides an improved process for preparing halogen-containing alpha-hydroxyhydrocarbylphosphonate and alpha-hydroxyhydrocarbylphosphinate esters by a process which comprises combining an aldehyde or ketone carbonyl compound (a) with a proton donating material (b) and a halogen-substituted alkyl ester of phosphoric acid or a phosphonous acid (c) substantially according to the following general equation:

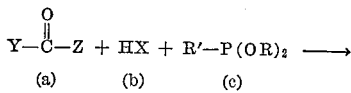

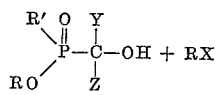

with the proviso that the carbonyl compound (a) has present either (b) or (c), and further providing that when a ketone is used as reactant (a) the proton donating material (b) is a mineral acid. In the carbonyl reactant (a), Y may be defined as being an alkyl radical having from 1 to about 17 carbon atoms, a monocyclic aryl radical having from 6 to about 8 carbon atoms, or a furyl or thienyl radical; Z taken alone may be hydrogen, or the methyl or ethyl radicals, and is methyl or ethyl only when Y is an alkyl radical having from 1 to 2 carbon atoms, and Y and Z taken together with the carbon atom to which they are attached complete a cycloalkanone ring having from 5 to 6 carbon atoms; HX, reactant (b), denotes a hydrogen donor which is either water, a non-oxidizing mineral acid, or a mixture of water and the non-oxidizing mineral acid; R' in the trivalent phosphorus ester reactant (c) is a chloroalkyloxy or a bromoalkyloxy radical having from 2 to about 12 carbon atoms, an alkyl radical having from 1 to about 12 carbon atoms, or the phenyl radical, and each R is either a chloroalkyl or bromoalkyl radical having from 2 to about 12 carbon atoms.

Although I do not wish to be bound to any particular theory, the following proposed mechanism is believed to be consistent with the facts and at least helps to explain the advantage of the claimed process over the prior art methods of preparing alpha-hydroxyphosphonate esters.

I believe that in the reaction there is first a transfer of a proton from the proton donator reactant to the oxygen of the carbonyl reactant to produce a strongly electrophilic carbon atom which then reacts with the nucleophilic phosphorus atom of the halogenated trivalent phosphorus ester reactant to give an unstable phosphonium intermediate, and this intermediate then rearranges to the alpha-hydroxyhydrocarbylphosphorus ester product with elimination of a by-product. Thus to illustrate, when a solution of tris(2-chloroethyl)phosphite and an equimolar amount or more of acetone is treated with an equimolar amount of hydrogen chloride, I believe that there is first a transfer of the proton from the hydrogen chloride to the oxygen of the acetone carbonyl group, thereby making the carbon atom of the carbonyl group strongly electrophilic. This electrophilic carbon atom then attracts and becomes bonded to the nucleophilic phosphorus atom of the tris(2-chloroethyl)phosphite to give a tris(2-chloroethoxy)hydroxypropylphosphonium chloride intermediate which rearranges to the bis(2-chloroethyl)(1-hydroxy-1-methylethyl)phosphonate product with elimination of 1,2-dichloroethane as by-product. Thus, surprisingly, the first step is not the reaction of the proton-donating agent with the phosphorus ester to produce a hydrogenphosphonate which then adds to the carbonyl reactant to give the final product. This was shown by first treating tris(2-chloroethyl)phosphite with hydrogen chloride in the absence of a carbonyl compound to give bis(2-chloroethyl) hydrogenphosphonate and then adding acetaldehyde. After standing several days, most of the hydrogenphosphonate and acetaldehyde was unreacted. However, when the hydrogen chloride was added to a mixture of tris(2-chloroethyl)phosphite and acetaldehyde according to the process of this invention, reaction was rapid and essentially complete when an equimolar amount of hydrogen chloride had been added. A good yield of bis(2-chloroethyl) - 1 - hydroxyethylphosphonate was obtained in this case.

Therefore, in conducting the process of this invention, the order in which the three reactants are combined has a substantial influence on the conversion of the reactants and on the yield of the desired halogenated alpha-hydroxypentavalentphosphorus ester product. In the process of this invention we have found that the best results are obtained by combining the carbonyl compound (a) admixed with either the proton donor reactant (b) or the trivalent phosphorus ester (c) with the third reactant. My preferred method for conducting the process is to add proton donor (b) to a mixture of the carbonyl compound (a) and the trivalent phosphorus ester (c). However, it is within the scope of the invention to combine the trivalent phosphorus ester reactant (c) with a mixture of the carbonyl compound (a) and the proton donator material (b). If this latter alternative is used, it is preferred that the carbonyl compound (a) and proton donator material (b) be combined just prior to combining this resulting mixture with the trivalent phosphorus ester to minimize possible side reactions between the proton donator material and the carbonyl compound. It is also within the scope of the invention to add all three reactants to the reaction vessel simultaneously, providing that there is present an excess of the carbonyl compound reactant. When the particular chosen combination of the carbonyl compound, proton donator material, and the trivalent phosphorus ester reactants includes proton donator and carbonyl reactants which may lead to side reactions, for efficient operation the process should be conducted according to the above mentioned preferred method of adding the proton donator (b) to a mixture of the selected carbonyl compound (a) and the trivalent phosphorus ester (c).

The three reactants are preferably combined in substantially stoichiometric proportions for efficient operation of the process, although the carbonyl compound may be supplied in somewhat of an excess from exact stoichiometry with the other two reactants to insure complete reaction. The process of this invention may be conducted by combining the carbonyl compound (a), the water, and/or mineral acid, (b), and the halogenated trivalent phosphorus ester (c) at a temperature range of about 0° C. to about 100° C. Lower temperatures may be useful when the lower molecular weight reactants, particularly the lower alkanecarboxaldehydes and the lower haloalkyl trivalent phosphorus esters are used, but for the higher molecular weight reactants, such low temperatures cause the reaction to proceed more slowly than is desired in most cases. Temperatures much higher than those stated may not be desired for most combinations of reactants because they tend to cause deleterious yield-lowering side reactions. For most combinations of reactants it is preferred to conduct the process at temperatures on the order of about 0° C. to about 50° C. or 75° C. until the reaction is substantially complete, at which time it may be desirable to raise the temperatures somewhat to insure complete reaction. Because the reaction is to some extent exothermic, especially with the lower molecular weight reactants, gradual combinations of the reactants with agitation is recommended at least in initial runs in order to obtain smooth reaction. Using the lower alkanecarboxaldehydes, which are very reactive, external cooling is usually advantageous. When working with the very reactive carbonyl compounds of this type, optimum conditions comprise gradual addition of the proton donator material to a mixture of the haloalkyl ester of the trivalent phosphorus acid and the aldehyde. However, as will be apparent to those skilled in the art, the exothermic nature of the reaction becomes less of a factor as the molecular weight of the reactants, and particularly the halogenated alkyl ester of the trivalent phosphorus ester (c), is increased.

Useful carbonyl compounds, that is, reactant (a) in the above described process, are generally the aliphatically saturated hydrocarbon aldehydes having from 2 to about 18 carbon atoms, the cycloaliphatic aldehydes having from 5 to 6 carbon atoms in the ring of such aldehydes and aromatic monocyclic carboxaldehydes preferably having from 7 to about 8 carbon atoms. Heterocyclic aldehydes such as 2- or 3-furfuraldehyde and 2- or 3-thiophenecarboxaldehyde may also be used. Lower dialkyl ketones having from 1 to 2 carbon atoms in each alkyl group thereof, and cyclopentanone and cyclohexanone may likewise be used. Aldehydes appear to participate in the reaction more readily than the ketones and are therefore the preferred reactants. Halogen, hydroxyl, cyano, carboxyl, carboalkyloxy, alkoxy, alkylthio- and acylamido substituents may be present in the above saturated aliphatic, and cycloaliphatic and aromatic monocyclic arylaldehydes without serious effect on the course of the reaction.

Examples of aldehydes that may be used thus include the alkanecarboxaldehydes, the lower members of which are preferred for reasons of cost and availability, specific examples of which are acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, stearaldehyde, as well as the cycloalkanecarboxaldehyde such as cyclopentylcarboxaldehyde and cyclohexylcarboxaldehyde.

Useful aromatic aldehyde reactants may be purely aromatic, or aliphatic aromatic aldehydes. And they may or may not be substituted with one or more halogen, hydroxyl, cyano, alkoxy, carboalkoxy, and acylamido groups. These arylaldehydes include benzaldehyde, o-, m-, and p-tolualdehyde, 2,3-dichlorobenzaldehyde, 3,4-dibromobenzaldehyde, 2-p-cymenecarboxaldehyde, vanillin, phthaldehydic acid, etc.

The aldehyde used may be a furanaldehyde such as furfural, 5-acetamido-2-furfuraldehyde, 5-bromo- and 5-chloro-2-furfuraldehyde, 5-methyl-2-furfuraldehyde, or a substituted thiophenecarboxaldehyde such as 5-methyl-2-thiophenecarboxaldehyde, etc.

Ketones generally are not as reactive as the aldehydes with the halogenated alkyl trivalent phosphorus esters. It is preferred, therefore, to limit the use of ketones in the reaction to the lower dialkyl ketones having from 1 to 2 carbon atoms in each alkyl group, such as acetone, methyl ethyl ketone, diethylketone, and to the cycloaliphatic ketones, e.g., cyclopentanone, and cyclohexanone. Because of the lower reactivity of the ketones in the process of this invention it is desirable to limit their use in the process to combinations of reactants which include the use of non-oxidizing mineral acids because the use of water alone tends to cause unwanted competing side reactions.

For the process of this invention the best results are obtained when the proton donating reactant (b) is either water or a non-oxidizing mineral acid. Examples of such non-oxidizing mineral acids include hydrogen chloride, hydrogen bromide, sulfurous acid, sulfuric acid, sulfonic acids, sulfinic acids, phosphorous acid, phosphoric acid, phosphonic acids, phosphinic acids and mixtures of such acids. The aqueous forms of the acids may also be used. We prefer to use hydrogen chloride or hydrogen bromide. Other proton donating materials such as the lower saturated aliphatic organic acids and the simple aromatic monocyclic carboxylic acids, e.g., acetic acid, propionic acid, butyric acid, hexanoic acid, benzoic acid, toluic acid, etc. could also be used with less advantageous results.

The halogen-substituted alkyl esters of the trivalent phosphorus acids which may be used as reactant (c) in the process of this invention include the tris(haloalkyl) phosphites and bis(haloalkyl) haloalkyl-, alkyl-, and arylphosphonites. The preferred esters are those wherein the halogen substituent on the alkyl ester group is chlorine, bromine, or mixtures thereof. For reasons of cost and availability the tris(chloroalkyl), tris(bromoalkyl), and tris(bromochloroalkyl) phosphites are particularly preferred.

Examples of such compounds include tris(2-chloroethyl), tris(chloropropyl), tris(dichloropropyl), tris (2-bromopropyl), tris(2-bromoethyl), bis(2-bromoethyl) 2 - chloroethyl, tris(3 - bromo - 2 - chloropropyl), tris (2 - chlorobutyl), tris(2 - chloro - 1 - methylpropyl), tris [(1 - chloromethyl)butyl], tris[(1 - bromomethyl)amyl], tris(6 - chlorooctyl), tris(bromochloropropyl), tris(2-chloro-2-ethylhexyl), tris(2-chlorodecyl), tris(3-bromo-undecyl), and tris(10,11-dibromodecyl) phosphites.

Examples of chloroalkyl and bromoalkyl phosphonite esters which may be used include bis(2-chloroethyl) ethylphosphonite, bis(2-bromopropyl) phenylphosphonite, bis(2-chloroethyl) phenylphosphonite, bis(chloropropyl) phenylphosphonite, bis(2-chlorobutyl) butylphosphonite, bis(2-bromohexyl) hexylphosphonite, bis(2-chlorobutyl) p-methylphenylphosphonite, bis(1-chloromethyl-1-methylethyl) octylphosphonite, 2-chlorobutyl 2-bromobutyl undecylphosphonite, bis(2-bromo-3-chloropropyl) phenylphosphonite, bis(10,11-dichlorododecyl) nonylphosphonite, etc.

A few representative examples of the alpha-hydroxypentavalentphosphorus esters and the reactants from which they are obtained are:

Bis(2 - chloroethyl) (1-hydroxy-1-methylethyl)phosphonate from tris(2-chloroethyl) phosphite, acetone and a non-oxidizing mineral acid such as hydrogen chloride;

Bis(2-bromopropyl) 1-hydroxy-1-cyclohexylphosphonate from tris(2-bromopropyl) phosphite, cyclohexanone, and hydrogen bromide;

Bis(2-chloro-3-bromopropyl) 1-hydroxyethylphosphonate from tris(2-chloro-3-bromopropyl) phosphite, acetaldehyde and water;

Bis(4 - chlorohexyl) 1 - hydroxyheptylphosphonate from tris(4-chlorohexyl) phosphite, heptylaldehyde, and a non-oxidizing aqueous mineral acid such as concentrated hydrochloric acid;

3-chlorobutyl (alpha-hydroxy-alpha-furyl) butylphosphinate from bis(3-chlorobutyl) butylphosphonite, 2-furfuraldehyde and sulfuric acid;

Bis(10,11-dibromododecyl) 1 - hyroxypropylphosphonate from tris(10,11-dibromododecyl) phosphite, propionaldehyde and phosphoric acid;

2-chloropropyl (1-hydroxy-1-methylpropyl) phenylphosphinate from bis(2-chloropropyl) phenylphosphonite, methyl ethyl ketone and hydrogen chloride;

Bis(2-chloroethyl) 1-hydroxyethylphosphonate from tris (2-chloroethyl) phosphite, acetaldehyde, and hydrochloric acid;

2-bromobutyl alpha - hydroxybenzyl(butyl) phosphinate from bis(2-bromobutyl) butylphosphonite, benzaldehyde and hydrobromic acid;

6-chlorooctyl (alpha-hydroxy - 4 - chlorobenzyl) phenylphosphinate from bis(6-chlorooctyl) phenylphosphonite, 4-chlorobenzylaldehyde and water;

Bis(bromomethyl - 2 - chloroethyl) 1 - hydroxyethylphosphonate from tris(bromomethyl-2-chloroethyl) phosphite, acetaldehyde and hydrogen chloride;

Bis(dichloropropyl) 1-hydroxyethylphosphonate from tris (dichloropropyl) phosphite, acetaldehyde, and hydrogen chloride.

The process of the present invention is readily conducted in the absence of an inert diluent. But the use of diluents may be employed and may be particularly advantageous when working with reactants that give solid products. Such diluents may be for example, benzene, toluene, methylene chloride, ether, or hexane. When employing no diluent and substantially the stoichiometric proportion of reactants, the reaction product may be used directly for a variety of industrial and agricultural purposes without purification, that is, it consists essentially of the alpha-hydroxy pentavalent phosphorus ester product admixed with the halogenated hydrocarbon by-product when hydrogen chloride or hydrogen bromide has been used in the process.

The products produced by the process of this invention are useful for a variety of agricultural purposes, e.g., as biological toxicants such as insecticides, fungicides, and as nematocides. These compounds, prepared from aldehydes and ketones having at least 2 or 3 carbon atoms, have substantial gasoline solubility and are of particular interest for use in gasoline fuel compositions for internal combustion engines as pre-ignition inhibiting agents and as de-icers, whereas a closely related known compound bis(2-chloroethyl) hydroxymethylphosphonate is essentially insoluble in gasoline. These compounds are also useful as flame-retarding additives in natural or synthetic, linear or cross-linked polymers in any conventional manner. They are of particular interest in this regard as reactive materials in polyurethane making ingredient recipes for reaction with and incorporation of phosphorus into the polyurethane in a stable form but not as part of the polymer chain.

The invention is further illustrated by the following examples.

*Example 1*

A solution of 311.6 g. (1.0 mole) of crude tris(2-chloropropyl) phosphite (obtained by treatment of phosphorus trichloride with propylene oxide) and 87.0 g. (1.5 moles) of acetone was treated with 36.4 g. (1.0 mole) of hydrogen chloride at 25–32°. The reaction mixture was allowed to stand at room temperature for five days, and then 100 g. of water and added and the mixture was made basic to litmus by adding sodium carbonate. The product layer was separated, washed twice with 100 g. portions of water and stripped to a pot temperature of 80° (0.2 mm.) to give 282.8 g. (96.6%) of colorless liquid, $n_D^{25}$ 1.4652, $p^{31}$ n.m.r. —27.1 p.p.m. The product, bis(2-chloropropyl) (1-hydroxy-1-methylethyl)phosphonate, completely solidified overnight. A portion was recrystallized from hexane to give a white solid, M.P. 55–56°.

*Analysis.*—Calcd. for $C_9H_{19}Cl_2O_4P$: C, 36.90; H, 6.54; Cl, 24.20; P, 10.58. Found: C, 37.01; H, 6.58; Cl, 24.13; P, 10.38.

*Example 2*

A solution of 539 g. (2.0 moles) of crude tris(2-chloroethyl) phosphite and 145 g. (2.5 moles) of acetone was treated with 72.8 g. (2.0 moles) of hydrogen chloride in 0.25 hr. at 25–32°. The product was washed as in the preceding example, and concentrated to 82° (0.2 mm.) to give 502.8 g. (94.9%) of colorless bis(2-chloroethyl) (1-hydroxy-1-methylethyl)phosphonate, $n_D^{25}$ 1.4753, $P^{31}$ n.m.r. —28 p.p.m.

*Analysis.*—Calcd. for $C_7H_{15}Cl_2O_4P$: Cl, 26.75; P, 11.70. Found: Cl, 27.65; P, 11.92.

| Infrared bands, cm.$^{-1}$: | Assignments |
|---|---|
| 3300 | —OH |
| 1240 | P=O |
| 1050–980 | P—O—C, C—OH |

*Example 3*

The addition of 72.4 g. (2.0 moles) of hydrogen chloride to a solution of 623 g. (2.0 moles) of tris(2-chloropropyl) phosphite and 111 g. (2.5 moles) of acetaldehyde and working up of the product as in the preceding examples gave 545 g. (98.7%) of colorless bis(2-chloropropyl) 1-hydroxyethylphosphonate, $n_D^{25}$ 1.4684, $P^{31}$ n.m.r. —25.9 p.p.m.

*Analysis.*—Calcd. for $C_8H_{17}Cl_2O_4P$: Cl, 25.43; P, 11.12; OH, 6.10. Found: Cl, 25.72; P, 11.00; OH, 6.03.

| Infrared bands, cm.$^{-1}$: | Assignments |
|---|---|
| 3300 | —OH |
| 1230 | P=O |
| 1100–920 | P—O—C, C—OH |

*Example 4*

Anhydrous hydrogen bromide, 88 g. (1.08 moles), was added to a mixture of 360 g. (1.33 moles) of crude tris-(2-chloroethyl) phosphite and 70 g. (1.6 moles) of acetaldehyde over a period of 0.3 hour with cooling at 21–24° C. The reaction mixture was warmed at 49–51° for 0.5 hour and then concentrated to a pot temperature of 60°/0.1 mm. to give 162 g. of by-product 1-bromo-2-chloroethane as distillate and 349 g. of crude bis(2-chloroethyl) 1-hydroxyethylphosphonate, $n_D^{25}$ 1.4797, $P^{31}$ n.m.r. —26.9 p.p.m.

Example 5

Tris(2-chloroethyl) phosphite, 0.5 mole, and redistilled acetaldehyde, 0.625 mole, were mixed and stirred as 0.25 mole of concentrated sulfuric acid was added in 0.2 hour with cooling at 20–25° C. The reaction mixture was stirred for 0.5 hour more and then washed with 5% Na$_2$CO$_3$ and with water and stripped to 60°/0.5 mm. to give an 89% yield of bis(2-chloroethyl) 1-hydroxyethylphosphonate, $n_D^{25}$ 1.4780, P$^{31}$ n.m.r. −27 p.p.m.

Example 6

When an equimolar solution of bis(2-chloroethyl) phenylphosphonite and 2-ethylhexaldehyde is treated with an equimolar quantity of hydrogen chloride, the major product is 2-chloroethyl 2-ethyl-1-hydroxyhexyl(phenyl) phosphinate.

Example 7

Distilled water, 9.0 g. (0.5 mole), was added slowly to a solution of 134.5 g. (0.5 mole) of tris(2-chloroethyl) phosphite and 44.0 g. (1.0 mole) of acetaldehyde with cooling at 26–28°. The reaction mixture was stirred at 25–38° for 0.5 hour more and then stripped to 60°/0.5 mm. to give 131.5 g. of colorless liquid, $n_D^{25}$ 1.4754, which was about 70% bis(2-chloroethyl) 1-hydroxyethylphosphonate according to P$^{31}$ n.m.r. measurements.

Example 8

This example illustrates the de-icing improvements that the compounds of this invention give to fuel compositions for internal combustion engines. The following carburetor icing test procedure was used to determine the effectiveness of the additive in the fuel in relation to the standard fuel containing no additive.

In brief, the operating conditions and procedure used for conducting the tests are as follows:

Conditions:
    40° F. intake air.
    90%±5% humidity.
    Continuous air circulation.

Procedure:
(1) Start cold engine.
(2) Accelerate to 1500 r.p.m. and maintain for one minute.
(3) Decelerate to idle r.p.m. and idle engine for one-half minute. Observe and record engine stalling characteristics.
(4) If engine stalls, immediately restart and rerun the cycles described by items 1 through 3 above.

Five conditions are necessary for promoting severe carburetor icing: (1) critical engine type; (2) low engine load and speed; (3) air temperature from approximately 35° to 45° F.; (4) ample humidity; and (5) volatile winter-grade gasoline. The engine, atmospheric conditions and operating procedure selected for these studies were each planned to emphasize icing conditions so that the reduction of ice formation attributable to an additive would be further reduced by several times under normal consumer conditions.

Except that the engine load and speed must be low, the selection of optimum speeds for carburetor icing tests is relatively flexible. In general, the throttle opening should be at a minimum adjustment for prolonged engine warm-up and for maximum throttle blade exposure to the moist air; and yet, the throttle must be sufficiently opened to cause adequate fuel flow through the carburetor's primary jets so that freezing temperatures will result from vaporization of the volatile gasoline.

Engine speed to attain these conditions was established at 1500 r.p.m.; and although ice formation begins on the throttle blade at this speed the engine seldom, if ever, stalls until the speed is reduced to idle. When decelerating from 1500 r.p.m. to idle, the air crack between the throttle valve and throttle body begins filling with ice, shutting off air into the manifold. Just prior to stalling, the air fuel ratio becomes excessively rich and occasionally causes the engine to "buck" before stalling. It should be noted, when reviewing the carburetor icing results that the engine sometimes idles throughout the allotted 30-second period without stalling but that "bucking" is observed, thus suggesting that a stall almost occurred.

At temperatures below 35° F., the moisture content of the air is generally too low for the rapid build-up of ice necessary for stalling, but the maximum air temperature for stalling is not so well established because of the influence of fuel volatility and carburetor design. Usually, standard procedure during carburetor icing tests is to maintain the air temperature at a constant level throughout the test at perhaps 40° F. The temperature control technique does not deviate from this when controlling the relative humidity to 90%±5%.

Regardless of the under-hood air temperatures, humidity is maintained at or near 90%. It is believed that this degree of humidity more definitely and clearly defines the additive effectiveness. The carburetor air inlet originates at the test cell cooling coils which constantly remain below 32° F. Therefore, if water droplets should be present in the atmosphere they are deposited on the coils, eliminating any possibility of their entering the air induction system. Air circulation over these coils is held at a constant rate by means of a forced-air recirculating system.

By using the above procedure, gasoline fuel mixtures containing about 200 parts per million of bis(2-chloropropyl) 1-hydroxyethylphosphonate gave only 10 stalls out of 16 tests. Similarly fuel containing about 200 parts per million of bis(2-chloroethyl) 1-hydroxy-1-methylethylphosphonate gave only 9 stalls out of 16 tests. The standard base fuel containing no such phosphorus additive gave 14 stalls out of 16 tests.

What is claimed is:

1. A compound of the formula

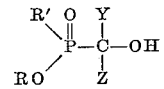

wherein R is selected from the group consisting of chloroalkyl and bromoalkyl having from 2 to about 12 carbon atoms, R' is selected from the group consisting of chloroalkyloxy and bromoalkyloxy having from 2 to about 12 carbon atoms, alkyl and alkyloxy having from 1 to about 12 carbon atoms, and phenyl, Y is selected from the group consisting of alkyl having from 1 to about 17 carbon atoms, monocyclic aryl having from 6 to about 8 carbon atoms, furyl, and thienyl; Z taken alone is selected from the group consisting of hydrogen and alkyl having from 1 to 2 carbon atoms and is alkyl only when Y is alkyl having from 1 to 2 carbon atoms; Y and Z taken together with the carbon atom to which they are attached complete a cycloalkanone ring having from 5 to 6 carbon atoms.

2. A compound as described in claim 1 wherein R is chloroalkyl having from 2 to about 12 carbon atoms; R' is chloroalkyloxy having from 2 to about 12 carbon atoms, Y is alkyl having from 1 to about 17 carbon atoms and Z is hydrogen.

3. Bis(2-chloropropyl) 1-hydroxyethylphosphonate.

4. Bis(2-chloroethyl) 1-hydroxyethylphosphonate.

5. A compound as described in claim 1 wherein R is chloroalkyl having from 2 to about 12 carbon atoms, R' is chloroalkyloxy having from 2 to about 12 carbon atoms, and Y and Z are each alkyl having from 1 to 2 carbon atoms.

6. Bis(2-chloroethyl) 1-hydroxy-1-methylethylphosphonate.

7. Bis(2-chloropropyl) 1-hydroxy-1-methylethylphosphonate.

8. A process which comprises combining (a) a carbonyl compound with a reactant selected from the group consisting of (b) a proton donating material, and (c) a halogen substituted alkyl ester of a trivalent phosphorus acid, with the proviso that the carbonyl compound reactant (a) has present the other member of said group of reactants (b) and (c), and also providing that when the carbonyl compound (a) is a ketone, the proton donating material (b) is a non-oxidizing mineral acid, said combination being conducted at a temperature of from about −25° C. to about 125° C., said carbonyl compound (a) having the formula

wherein Y is selected from the group consisting of alkyl having from 1 to about 17 carbon atoms, monocyclic aryl having from 6 to about 8 carbon atoms, furyl and thienyl; Z taken alone is selected from the group consisting of hydrogen and alkyl having from 1 to 2 carbon atoms, and is alkyl having from 1 to 2 carbon atoms only when Y is alkyl having from 1 to 2 carbon atoms; Y and Z taken together with the carbon atom to which they are attached complete a cycloalkanone ring having from 5 to 6 carbon atoms; said proton donating material (b) being selected from the group consisting of water, non-oxidizing mineral acids, and mixtures of water and non-oxidizing mineral acids, and the halogen-substituted alkyl ester of a trivalent phosphorus acid (c) having the formula

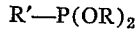

wherein each R is selected from the group consisting of chloroalkyl and bromoalkyl having from 2 to about 12 carbon atoms, and R' is selected from the group consisting of chloroalkyloxy and bromoalkyloxy having from 2 to about 12 carbon atoms, alkyl and alkyloxy having from 1 to about 12 carbon atoms, and phenyl, to obtain as a product of the process a compound having the formula

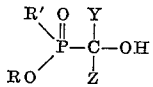

wherein R, R', and Y, and Z are as defined above.

9. A process as described in claim 8 wherein in the carbonyl reactant (a) Y is alkyl having from 1 to 17 carbon atoms and Z is hydrogen; the proton donating material (b) is a substantially anhydrous non-oxidizing mineral acid and in the halogen substituted alkyl ester of the trivalent phosphorus acid (c) each R is chloroalkyl having from 2 to about 12 carbon atoms, and R' is chloroalkoxy having from 2 to about 12 carbon atoms to obtain as product of the resulting reaction a bis(chloroalkyl) 1-hydroxyalkylphosphonate.

10. A process as described in claim 9 wherein in the carbonyl reactant (a) Y is methyl, Z is hydrogen; the substantially anhydrous non-oxidizing mineral acid reactant (b) is hydrogen chloride; and the halogen substituted alkyl ester of a trivalent phosphorus acid (c) is tris(2-chloropropyl) phosphite to obtain as product of the result reaction bis(2-chloropropyl) 1-hydroxyethylphosphonate.

11. A process as described in claim 9 wherein the carbonyl reactant (a) Y is methyl, and Z is hydrogen; the substantially anhydrous non-oxidizing mineral acid reactant (b) is hydrogen bromide; and the halogen-substituted alkyl ester of the trivalent phosphorus acid reactant (c) is tris(2-chloroethyl) phosphite to obtain as product of the resulting reaction bis(2-chloroethyl) 1-hydroxyethylphosphonate.

12. A process as described in claim 8 wherein in the carbonyl reactant (a) Y is alkyl having from 1 to 2 carbon atoms, and Z is methyl; the proton donating material (b) is a substantially anhydrous non-oxidizing mineral acid; and in the halogen-substituted alkyl ester of a trivalent phosphorus acid (c) each R is chloroalkyl having from 2 to about 12 carbon atoms, and R' is chloroalkyloxy having from 2 to about 12 carbon atoms to obtain as product of the resulting reaction a bis(chloroalkyl) 1-hydroxy-1-methylalkylphosphonate.

13. A process as described in claim 12 wherein in the carbonyl reactant (a) each of Y and Z is methyl; the substantially anhydrous non-oxidizing mineral acid (b) is hydrogen chloride; and the halogen-substituted alkyl trivalent phosphorus ester is tris(2-chloropropyl) phosphite, to obtain as product of the resulting reaction bis(2-chloropropyl) 1-hydroxy-1-methylethylphosphonate.

14. A process as described in claim 12 wherein in the carbonyl reactant (a) each of Y and Z is methyl; the substantially anhydrous non-oxidizing mineral acid (b) is hydrogen chloride; and the halogen-substituted alkyl ester of a trivalent phosphorus acid is tris(2-chloroethyl) phosphite to obtain as product of resulting reaction bis(2-chloroethyl) 1-hydroxy-1-methylethylphosphonate.

References Cited

UNITED STATES PATENTS 2,579,810   12/1951   Fields _____ 260—953 X

CHARLES B. PARKER, *Primary Examiner.*

B. BILLIAN, *Assistant Examiner.*